US008918663B2

(12) United States Patent
Russo et al.

(10) Patent No.: US 8,918,663 B2
(45) Date of Patent: Dec. 23, 2014

(54) METHOD FOR ACTIVE POWER MANAGEMENT IN A SERIAL ATA INTERFACE TO OPERATE AT MOST A PREDETERMINED RATE UPON A REFUSED SPEED REQUEST

(75) Inventors: Leonard E Russo, Tomball, TX (US); James Kenny Yates, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 13/259,595

(22) PCT Filed: Jun. 7, 2009

(86) PCT No.: PCT/US2009/046530
§ 371 (c)(1),
(2), (4) Date: Sep. 23, 2011

(87) PCT Pub. No.: WO2010/144075
PCT Pub. Date: Dec. 16, 2010

(65) Prior Publication Data
US 2012/0023350 A1  Jan. 26, 2012

(51) Int. Cl.
*G06F 1/32* (2006.01)
*G06F 13/42* (2006.01)
*G06F 3/06* (2006.01)

(52) U.S. Cl.
CPC .............. *G06F 1/3203* (2013.01); *G06F 13/42* (2013.01); *G06F 1/3268* (2013.01); *G06F 3/0625* (2013.01)
USPC ........................................................ 713/320

(58) Field of Classification Search
CPC ......... G06F 1/3234; G06F 1/26; G06F 13/42; G06F 13/4282; G06F 13/4286; G06F 1/3268; G06F 1/32; G06F 3/0625; G06F 1/3203
USPC ............................................................. 713/320
See application file for complete search history.

(56) References Cited

U.S. PATENT DOCUMENTS

| | | | |
|---|---|---|---|
| 6,215,793 B1 * | 4/2001 | Gultekin et al. | 370/465 |
| 7,069,347 B1 * | 6/2006 | Kolokowsky | 710/8 |
| 7,366,930 B2 * | 4/2008 | Gutman et al. | 713/320 |
| 7,616,587 B1 * | 11/2009 | Lo et al. | 370/254 |
| 7,774,424 B1 * | 8/2010 | Bailey et al. | 709/211 |
| 2004/0151116 A1 * | 8/2004 | Sultenfuss et al. | 370/232 |
| 2005/0005178 A1 | 1/2005 | Bashford et al. | |
| 2005/0055456 A1 * | 3/2005 | Chalupsky et al. | 709/233 |
| 2006/0026315 A1 * | 2/2006 | Hong et al. | 710/60 |
| 2007/0189175 A1 * | 8/2007 | Vedanabhatla et al. | 370/241 |
| 2007/0192505 A1 * | 8/2007 | Dalmia | 709/233 |
| 2008/0133951 A1 | 6/2008 | Igari | |
| 2008/0184051 A1 | 7/2008 | Cheong et al. | |
| 2010/0169899 A1 * | 7/2010 | Faulhaber et al. | 719/326 |

OTHER PUBLICATIONS

International Searchin Authority, International Search Report and Written Opinion, Appln. No. PCT/US2009/046530, date of mailing Feb. 25, 2010, 11 p.

* cited by examiner

*Primary Examiner* — Thomas Lee
*Assistant Examiner* — Danny Chan

(57) ABSTRACT

A method for active power management in a Serial ATA interface for data transfer between a host and a device, the method starts with the determining of an optimal data transfer rate for transferring data between the host and the device. Then switching the Serial ATA interface into an active power saving mode based on the optimal data transfer rate is performed.

18 Claims, 3 Drawing Sheets

METHOD FOR ACTIVE POWER MANAGEMENT IN A SERIAL ATA INTERFACE TO OPERATE AT MOST A PREDETERMINED RATE UPON A REFUSED SPEED REQUEST

BACKGROUND

Serial ATA (SATA) Interfaces are used as interfaces between a peripheral device such as a hard disk drive and a host such as a personal computer. SATA interface is primarily designed for transfer of data between such a host and attached device.

In attempting to better manage power consumption and power savings in SATA, SATA power management is typically handled by three interface power states. The three SATA interface power states are: PhyReady, Partial, and Slumber.

In PhyReady state the interface is synchronized and capable of receiving and sending data. In Partial and Slumber states are the two power saving modes. In both Partial and Slumber states, the interface is not in condition for any active receiving and sending of data. The difference between Partial and Slumber states is mainly in the time required for them to be restored to PhyReady state. SATA standards stipulate that time required to restore from a Partial state to a PhyReady state be no more than 10 us while the time required to restore from a Slumber state to PhyReady state is no more than 10 ms.

These interface power states maybe initiated either by the Host or the Device and are often referred to as Host Initiated Power Management (HIPM) or Device Initiated Power Management (DIPM). The interface power states can further be associated with the Device power management states. In both HIPM and DIPM, what triggers a switch of a power saving mode to the Partial and Slumber interface power state is the lack of activity or data transfer in the interface when the interface is in a PhyReady state.

HIPM and DIPM are not direct user managed methods for power management on the interface and the switching to power savings modes are dependent on a lack of activity on the SATA interface. In addition, once in the power saving modes, no data transfer occurs on the interface until the interface is switched back to the PhyReady State.

BRIEF DESCRIPTION OF THE DRAWINGS

For a detailed description of embodiments of the invention, reference will now be made to the accompanying drawings in which.

DETAILED DESCRIPTION

SATA interface is currently slated for a maximum data transfer rate of 6.0 Gps with additional slower rates at 3.0 Gps and 1.5 Gps. Power consumption of such a Serial ATA interface when transferring data between host and devices at the higher 6.0 Gps rate is substantially higher than rates of 3.0 Gps or 1.5 GPs. Actively switching to a data transfer rate of the interface to 3.0 Gps or 1.5 Gps can result in overall reduction of power consumption as compared to running a data transfer rate of 6.0 Gps.

Currently, optimal data transfer rates are first automatically established by the host and device at the start of power up operations in a system using SATA interface. Such optimal data transfer rates are dependent on whether such a data transfer rate is supported by both the host and the device. Actively switching the established optimal interface transfer rate to a lower interface transfer rate can result in overall reduction of power consumption on the interface.

Figure 1:
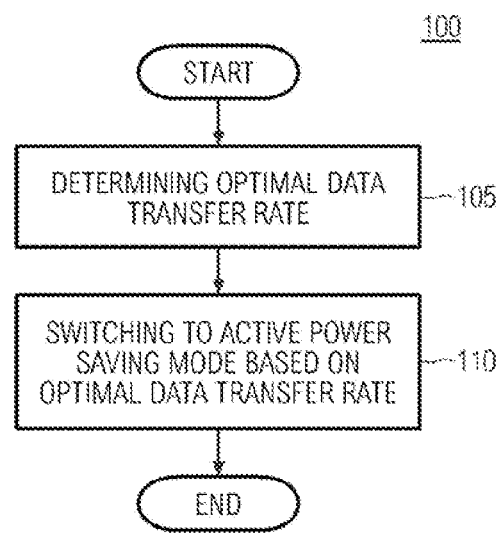
FIG. 1 is a flow chart showing a method for active power management in a Serial ATA interface.

Referring to FIG. 1, a method 100 for active power management in a Serial ATA interface for data transfer between a host and a device according to one embodiment is shown. The method 100 starts with the determining 105 of an optimal data transfer rate for transferring data between the host and the device. Then switching 110 the Serial ATA interface into an active power saving mode based on the earlier determined optimal data transfer rate is performed.

Figure 2:
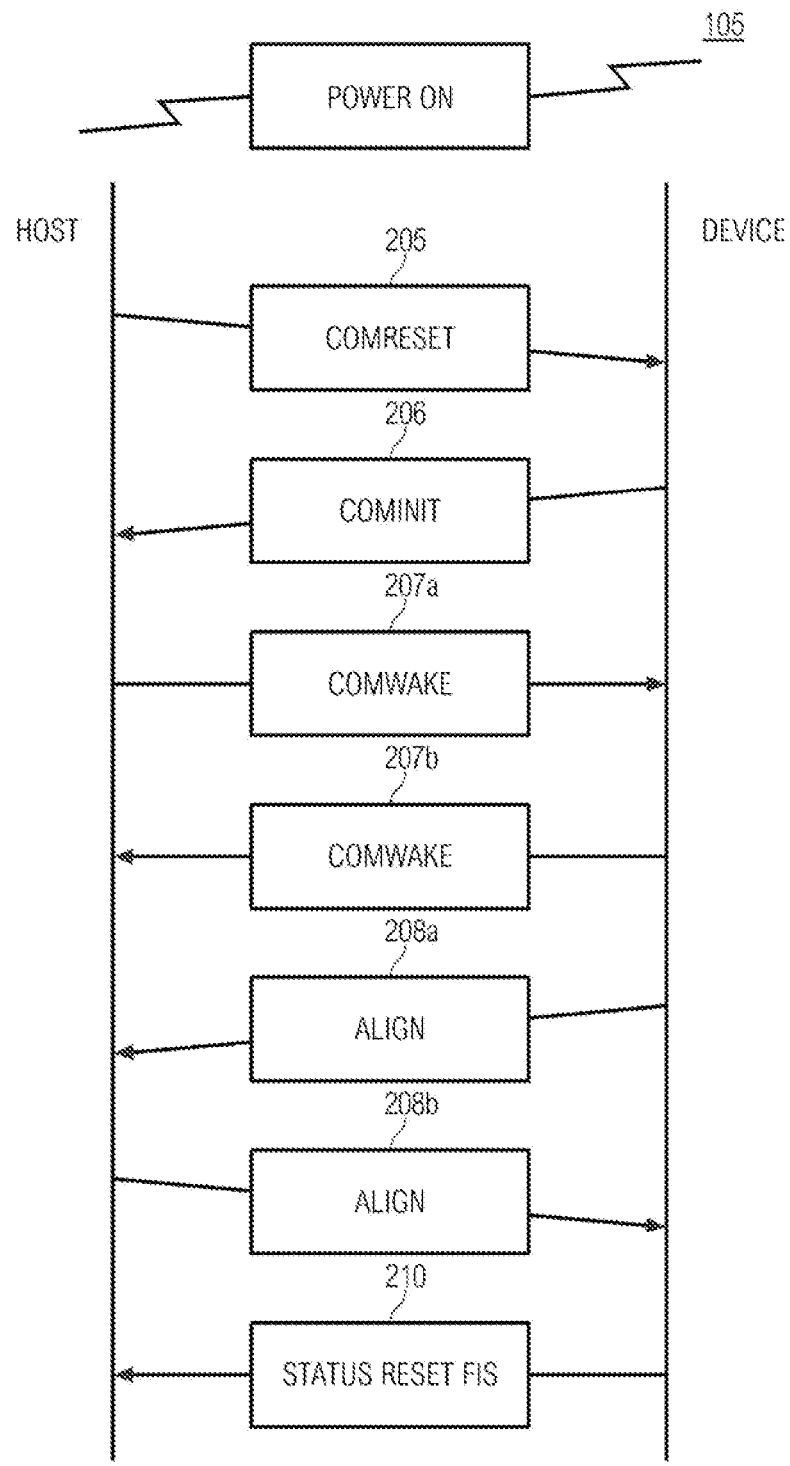
FIG. 2 shows a data flow of the determining of the optimal data transfer rate of FIG. 1.

Referring to FIG. 2, the determining 105 of the optimal data transfer rate further comprises a set of communication signals according to the Serial ATA protocol between the host and the device. On POWER ON of a system comprising the host and the device, the host initiates communication by transmitting COMRESET 205 to the device. The device responds by transmitting a COMINIT 206 signal to confirm its readiness for additional instructions. The host responds with a COMWAKE 207a command which is similarly echoed by the device via a COMWAKE 207b command, if the device is ready and active. After a predetermined length of time, the device transmits a ALIGN 208a signal comprising the highest data transfer rate available to the device. If the host is able to support that highest data transfer rate, host responds with a corresponding ALIGN 208b signal and synchronization of the host and device occurs. The device then transmits a STATUS RESET FIS (FIS 34) 210 to the host. The host and device would then have selected that highest or maximum data transfer rate supported by both the host and the device as the optimal data transfer rate.

However, if the data transfer rate sent by the device in the ALIGN 208a signal cannot be handled by the host for whatever reason, the host will not respond. After a predetermined period of time, when the device has not received the corresponding ALIGN 208b signal from the host, the device will send another ALIGN 208a signal comprising a data transfer rate lower than the earlier sent data transfer rate in the ALIGN 208a signal. The selected data transfer rate is the next available lower data transfer rate according to the Serial ATA standards. The device will continue sending and lowering the data transfer rates until the host responds to accept the data transfer rate. That accepted data transfer rate will then be designated the optimal data transfer rate. The optimal data transfer rate is usually the highest available data transfer rate supported by both the host and the device.

Figure 3:
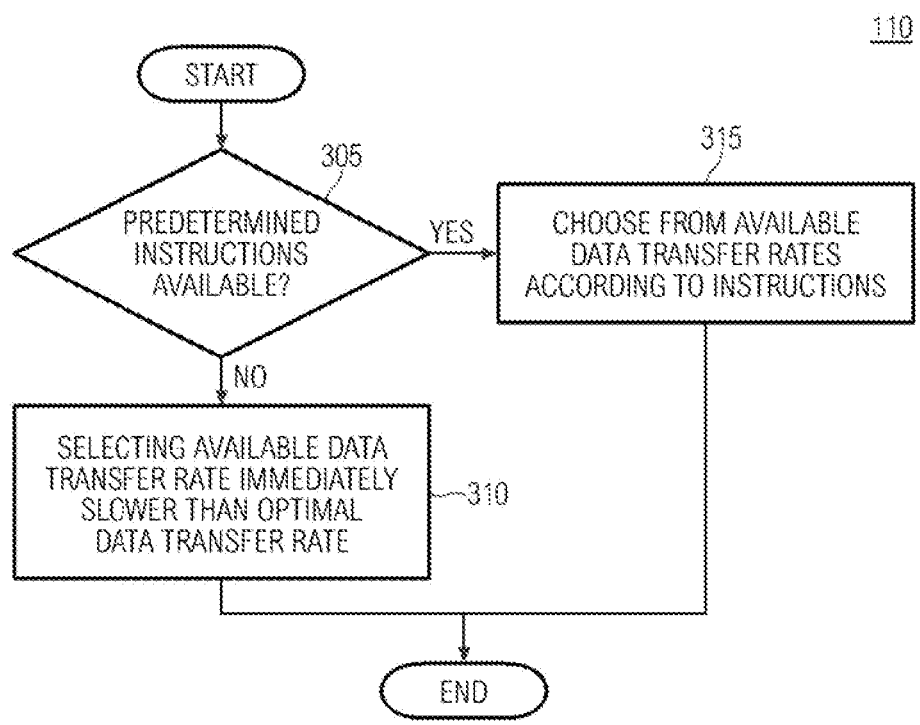
FIG. 3 is a flow chart showing the switching to active power saving mode of FIG. 1.

Referring to FIG. 3, now that the optimal data transfer rate has been determined 105, the switching 110 to active power saving mode is further shown. An option for following predetermined 305 instructions may be made available for selecting of a lower data transfer rate to reduce consumption of power. If a predetermined 305 instruction had been provided, the next step would actively result in choosing 315 from available data transfer rates according to the predetermined instructions provided. The predetermined instructions should specify a lower data transfer rate available than the optimal data transfer rate.

Alternatively, if predetermined 305 instructions are not available, the method in this embodiment automatically selects 310 from the available data transfer rates the data transfer rate immediately slower than the optimal data transfer rate. The optimal data transfer rate is usually the highest available data transfer rate supported by both the host and the device. Choosing the lower data transfer rate which is slower than the earlier optimal data transfer rate will result in the Serial ATA interface transferring data at the lower data transfer rate and thus consuming less power.

In operation, the above embodiment may be performed by a system having a Serial ATA interface and at least one host and at least one device. Upon powering up such a system utilizing the Serial ATA interface. The host and device carry out Serial ATA communications protocol to determine the maximum data transfer rate available between the host and the device. If active power management of the system is desired, a user may provide instructions in advance to the system for switching to a power saving mode. The instructions may be for example to switch to a power saving mode when the system is running on batteries only. For example, a laptop disconnected from the power supply from the mains and running solely on batteries. Once such an instruction is provided, the system then initiates switching to a power saving mode by lowering the data transfer rate of the Serial ATA interface from the maximum data transfer rate available utilizing the process described in FIG. 2 and limiting the interface speed either at the device or the host.

In another embodiment, the method for active power management in a Serial ATA interface for data transfer between a host and a device may further be activated at the stage of establishing of maximum data transfer rate communication protocol. In this embodiment, the host of such a system would have received predetermined instructions not to accept a higher data transfer rate or not to accept higher than a predetermined data transfer rate. As such, during the establishing of the maximum data transfer rate communication protocol, the host would refuse to transmit at a higher data transfer rate ALIGN 208a request from the device and only transmit at a lower data transfer rate.

In this embodiment, referring to FIG. 1, the method similarly involves a determining of the optimal data transfer rate. Referring to FIG. 2, the host and the device determining 105 of the optimal data transfer rate further also comprises a set of communication signals according to the Serial ATA protocol between the host and the device. However, the host in this embodiment has already received predetermined instructions not to transmit a higher data transfer rate in its ALIGN 208b request to the device. An example would be that instead of transmitting a 6.0 Gps transfer rate in its ALIGN request to the device, it transmits a 3.0 Gps instead. This limits the device to a lower data transfer rate even if a higher one e.g. 6.0 Gps was available. The device then transmits the STATUS RESET FIS 210 based on the accepted lower data transfer rate which is now the accepted optimal data transfer rate.

The method further then switches to an active power saving mode by selecting the optimal data transfer rate which is lower than the maximum data transfer rate available to the host and the device.

In yet another embodiment, the method may be device initiated. The device may have received predetermined instructions from the host to ensure that the device would transmit at a data transfer rate that is lower than what is available itself and to the host. At the determining 105 of the optimal data transfer rate, the device refuses to transmit a ALIGN 208a signal with a higher data transfer rate, even if the host or the device is able to operate at that higher transfer rate. The predetermined instructions would instruct the device to only transmit a predetermined lower data transfer rate or other than a higher data transfer rate.

Numerous variations and modifications will become apparent to those skilled in the art once the above disclosure is fully appreciated.

What is claimed is:

1. A method for active power management in a Serial ATA (SATA) interface for data transfer between a host and a device, comprising:
   receiving, by the host, an instruction to enter a power saving mode, the power saving mode having a predetermined data transfer rate at which the host is not to exceed when transferring data to lower power consumption during data transfer;
   after receiving the instruction to enter the power saving mode, during a SATA stage in which a maximum data transfer rate is established:
      communicating by the host with the device to determine a highest data transfer rate at which the host can communicate with the device such that the device learns the highest data transfer rate;
      after communicating with the device to determine the highest data transfer rate, receiving, by the host from the device, a first SATA request to conduct data transfer at a first data transfer rate greater than the predetermined data transfer rate that is less than the highest data transfer rate at which the host is able in actuality to conduct data transfer;
      in response to receiving the first SATA request, refusing the first SATA request from the device by the host;
      after refusing the first SATA request, receiving, by the host from the device, a second SATA request to conduct data transfer at a second data transfer rate less than the first data transfer rate and no greater than the predetermined data transfer rate; and
      in response to receiving the second SATA request, accepting the second SATA request from the device by the host, such that data transfer is conducted at the second data transfer rate without data transfer having been conducted at the first data transfer rate.

2. The method of claim 1, wherein refusing the first SATA request from the device by the host comprises:
   sending, by the host to the device, a third SATA request to conduct data transfer at the second data transfer rate.

3. The method of claim 2, wherein the third SATA request is a SATA ALIGN request specifying the second data transfer rate.

4. The method of claim 3, wherein the first SATA request is a SATA align request specifying the first data transfer rate.

5. The method of claim 4, wherein the second SATA request is a SATA STATUS RESET FIS request accepting the second data transfer rate.

6. The method of claim 1, wherein the first SATA request is a SATA ALIGN request specifying the first data transfer rate.

7. The method of claim 1, wherein the second SATA request is a SATA STATUS RESET FIS request specifying the second data transfer rate.

8. A host apparatus comprising:
   a Serial ATA (SATA) interface to connect with a device, the SATA interface having a highest data transfer rate at which data transfer in actuality can be conducted; and
   a SATA controller to receive an instruction to enter a power saving mode having a predetermined data transfer rate that is not to be exceeded when transferring data to lower power consumption during data transfer and after receiving the instruction during a SATA stage in which a maximum data transfer rate is established:

communicate with the device to determine a highest transfer rate at which the host apparatus can communicate with the device such that the device learns the highest data transfer rate;

after communicating with the device to determine the highest transfer rate, receive from the device a first SATA request to conduct data transfer at a first data transfer rate greater than the predetermined data transfer rate that is less than the highest data transfer rate;

refuse the first SATA request from the device;

after refusing the first SATA request, receive from the device a second SATA request to conduct data transfer at a second data transfer rate less than the first data transfer rate and no greater than the predetermined data transfer rate; and in response to receiving the second SATA request, accept the second SATA request, such that data transfer is conducted at the second data transfer rate without data transfer having been conducted at the first data transfer rate.

9. The host apparatus of claim 8, wherein the SATA controller is programmed to not accept a data transfer rate from the device that is greater than the predetermined data transfer rate.

10. The host apparatus of claim 8, wherein the SATA controller is to refuse the first SATA request by sending a third SATA request to the device to conduct data transfer at the second data transfer rate.

11. The host apparatus of claim 8, wherein the first SATA request is a SATA align request specifying the first data transfer rate, and the second SATA request is a SATA STATUS RESET FIS request accepting the second data transfer rate.

12. The host apparatus of claim 8, wherein the first SATA request is a SATA ALIGN request specifying the first data transfer rate, and the second SATA request is a SATA STATUS RESET FIS request specifying the second data transfer rate.

13. A non-transitory computer-readable data storage medium storing computer-executable code executable by a device to perform a method comprising:

receiving an instruction to enter a power saving mode, the power saving mode having a predetermined data transfer rate at which the host is not to exceed when transferring data to lower power consumption during. data transfer during a Serial ATA (SATA) stage in which a maximum data transfer rate for data transfer between the device and a host is established:

communicating by the device with the host to determine a highest data transfer rate at which the host can communicate with the device such that the device learns the highest data transfer rate;

after communicating with the host to determine the highest data transfer rate, sending to the host a first SATA request to conduct data transfer at a first data transfer rate greater than the predetermined data transfer rate that is less than a highest data transfer rate at which the host is able in actuality to conduct data transfer;

in response to sending the first SATA request, receiving a refusal from the host of the first SATA request;

after receiving the refusal of the first SATA request, sending to the host a second SATA request to conduct data transfer at a second data transfer rate less than the first data transfer rate and no greater than the predetermined data transfer rate; and in response to sending the second SATA request, receiving acceptance from the host of the second SATA request, such that data transfer is conducted at the second data transfer rate without data transfer having been conducted at the first data transfer rate.

14. The non-transitory computer-readable data storage medium of claim 13, wherein receiving the refusal from the host of the first SATA request comprises:

receiving from the host a third SATA request to conduct data transfer at the second data transfer rate.

15. The non-transitory computer-readable data storage medium of claim 14, wherein the third SATA request is a SATA ALIGN request specifying the second data transfer rate, the first SATA request is a SATA align request specifying the first data transfer rate, and the second SATA request is a SATA STATUS RESET FIS request accepting the second data transfer rate.

16. The non-transitory computer-readable data storage medium of claim 13, wherein the first SATA request is a SATA ALIGN request specifying the first data transfer rate, and the second SATA request is a SATA STATUS RESET FIS request specifying the second data transfer rate.

17. The non-transitory computer-readable medium of claim 13, wherein communicating by the device with the host to determine the highest data transfer rate at which the host can communicate with the device such that the device learns the highest data transfer rate comprises:

sending a first request by the device to the host to determine if the host can support a first data transfer rate;

if the host replies to the first request within a predetermined length of time, concluding by the device that the host can maximally support the first data transfer rate and setting the highest data transfer rate to the first data transfer rate;

if the host does not reply to the first request within the predetermined length of time, sending a second request by the device to the host to determine if the host can support a second data transfer rate lower than the first data transfer rate; and if the host replies to the second request within the predetermined length of time, concluding by the device that the host can maximally support the second data transfer rate and setting the highest data transfer rate to the second data transfer rate.

18. The non-transitory computer-readable medium of claim 13, wherein communicating by the device with the host to determine the highest data transfer rate at which the host can communicate with the device such that the device learns the highest data transfer rate comprises:

sending in succession one or more requests by the device to the host corresponding to successively lower data transfer rates until the host replies to a given request;

concluding by the device that the host can maximally support a data transfer rate of the given request to which the host replies; and setting the highest data transfer rate to the data transfer rate of the given request to which the host replies.

* * * * *

UNITED STATES PATENT AND TRADEMARK OFFICE
CERTIFICATE OF CORRECTION

PATENT NO. : 8,918,663 B2
APPLICATION NO. : 13/259595
DATED : December 23, 2014
INVENTOR(S) : Russo et al.

It is certified that error appears in the above-identified patent and that said Letters Patent is hereby corrected as shown below:

In the claim

Column 4, line 65, Claim 8, delete "transfer" and insert -- transfer, --, therefor.

Column 4, line 66, Claim 8, delete "instruction" and insert -- instruction, --, therefor.

Column 5, line 46, Claim 13, delete "during." and insert -- during --, therefor.

Column 5, line 46, Claim 13, delete "transfer" and insert -- transfer; --, therefor.

Column 6, line 27, Claim 17, delete "medium" and insert -- data storage medium --, therefor.

Column 6, line 48, Claim 18, delete "medium" and insert -- data storage medium --, therefor.

Signed and Sealed this
Fifth Day of May, 2015

Michelle K. Lee
*Director of the United States Patent and Trademark Office*